United States Patent [19]

Kopecky

[11] Patent Number: 4,607,581
[45] Date of Patent: Aug. 26, 1986

[54] FURROW OPENER FOR SEEDER
[75] Inventor: Ivyl D. Kopecky, Ypsilanti, N. Dak.
[73] Assignee: Haybuster Manufacturing, Inc., Jamestown, N. Dak.
[21] Appl. No.: 632,056
[22] Filed: Jul. 18, 1984
[51] Int. Cl.⁴ ............................................... A01C 5/00
[52] U.S. Cl. ........................................ 111/73; 111/85; 111/86
[58] Field of Search .................. 111/7, 52, 73, 89, 85, 111/86

[56] References Cited

U.S. PATENT DOCUMENTS

| | | | |
|---|---|---|---|
| 909,991 | 1/1909 | Cole. | |
| 1,473,297 | 11/1923 | Knight | 111/86 |
| 2,048,441 | 7/1936 | Feltman | 111/59 |
| 2,259,303 | 10/1941 | Ewerth | 111/85 X |
| 2,889,788 | 6/1959 | Van Dorn | 111/80 |
| 2,924,189 | 2/1960 | McLeod | 111/80 |
| 3,122,111 | 2/1964 | Taylor, Sr. | 111/80 |
| 3,188,988 | 6/1965 | Peck | 111/85 X |
| 3,854,429 | 12/1974 | Blair | 111/7 |
| 4,417,530 | 11/1983 | Kopecky | 111/73 |

FOREIGN PATENT DOCUMENTS 581901 11/1977 U.S.S.R. ........................ 111/85
906418 2/1982 U.S.S.R. ........................ 111/85

Primary Examiner—James R. Feyrer
Attorney, Agent, or Firm—Kinney & Lange

[57] ABSTRACT

A furrow opener shank for use with seeders has seed outlets and fertilizer outlets at the lower end thereof, and includes a sealer plate which will permit the depositing of anhydrous ammonia or liquid fertilizer in a deep furrow and which positively seals the furrow prior to depositing the seeds in the furrow. The sealer plate has wedges that form a pair of grooves or small furrows spaced laterally of the center line of the furrow to provide pockets for the seeds being deposited. The shank has dual outlets for seed at the lower end so that seed is deposited in each of the furrows that are being formed by the sealer plate to keep the seed separated from the fertilizer to insure good germination and rapid growth as well as insuring placement of the seed in regions that are most likely to have moist soil.

9 Claims, 4 Drawing Figures

U.S. Patent  Aug. 26, 1986  4,607,581
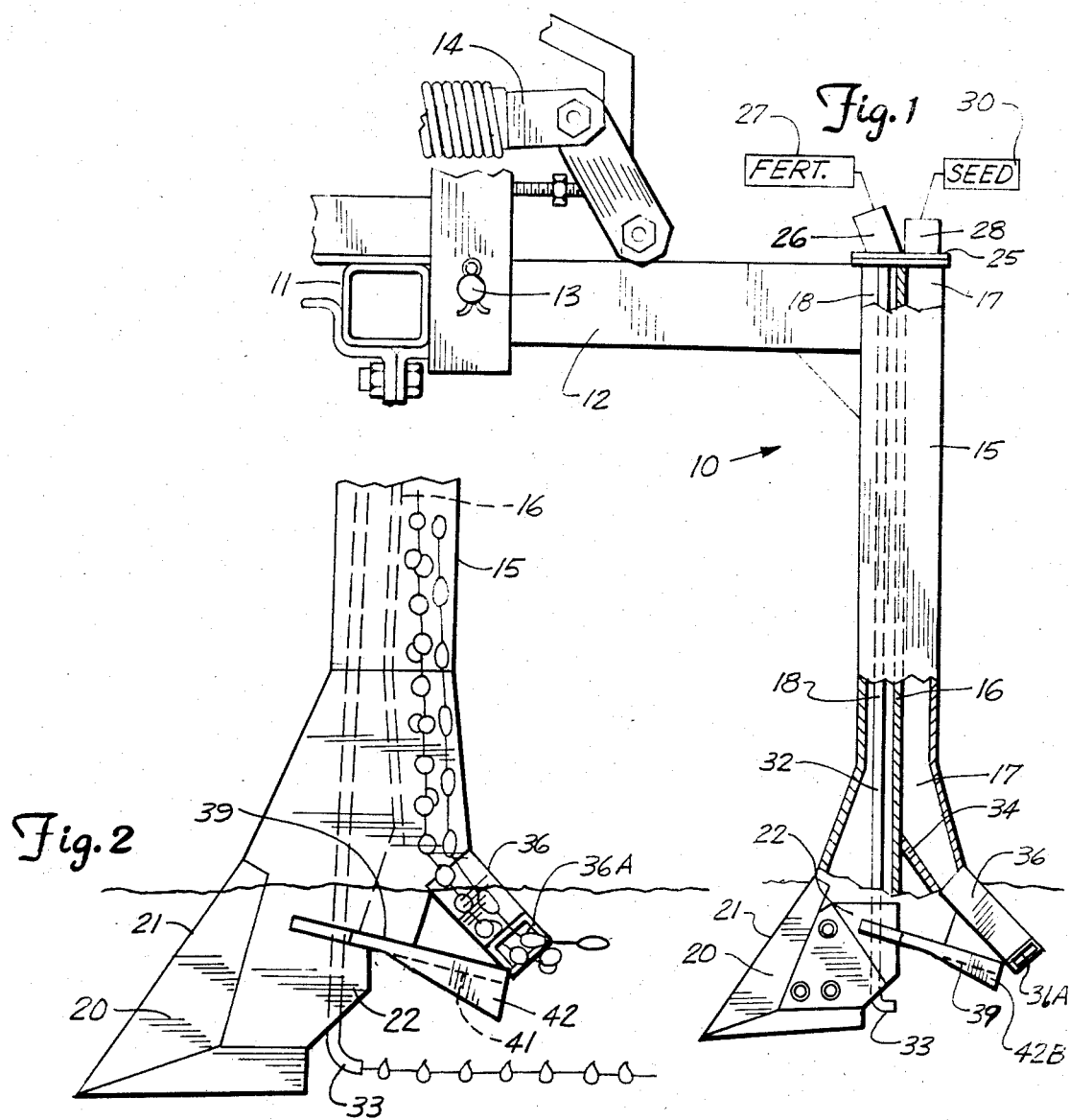
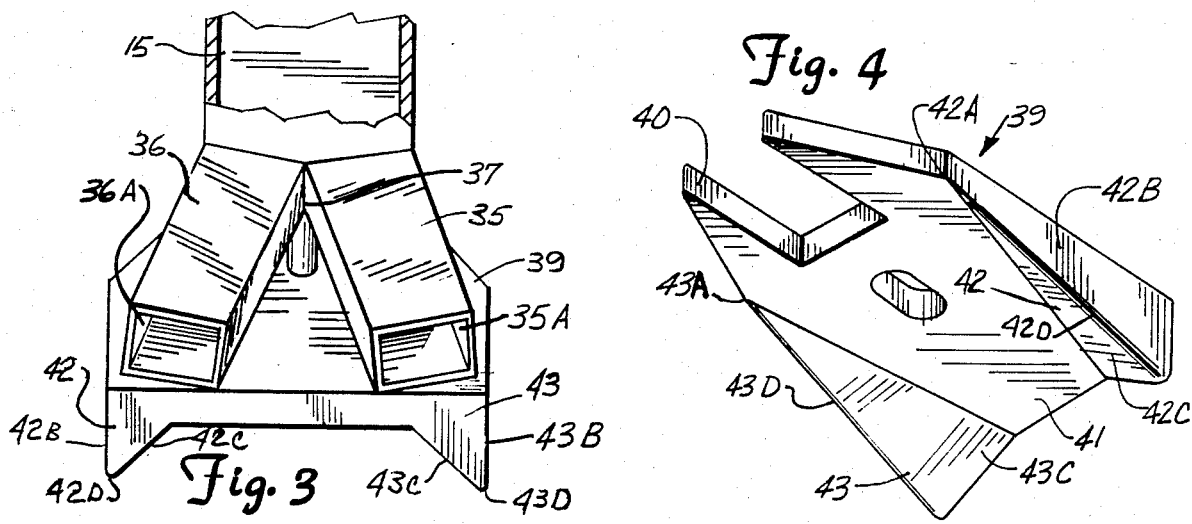

`4,607,581`

FURROW OPENER FOR SEEDER

BACKGROUND OF THE INVENTION

Reference is hereby made to U.S. patent application Ser. No. 563,198, filed Dec. 19, 1983 for Seeding Apparatus with Fertilizer Applicator now U.S. Pat. No. 4,565,141.

1. Field of the Invention

The present invention relates to a furrow opener for seeder that has dual outlet tubes for the seed and a positive sealing plate which also forms small furrows for receiving the seed.

2. Description of the Prior Art

Seed and fertilizer applicators are widely used at the present time. It has also been recognized that furrow opener shanks that have two vertical passageways can be utilized for applying seed and/or fertilizer in a furrow. For example, U.S. Pat. No. 4,417,530 shows a planting apparatus having a shank that deposits seeds through two different passageways in the shank and at two different depths. This patent also illustrates a dual outlet tube which places seed laterally of the center line of the shank in two separate paths to separate the seed from the furrow in which fertilizer will be deposited.

The prior art also shows devices such as that in U.S. Pat. No. 2,924,189 for planting at two different depths. U.S. Pat. No. 909,991 shows a grain drill shoe that has two passageways near the furrow opener, but does not have two individual fore and aft extending passageways for depositing material.

U.S. Pat. Nos. 2,889,788 and 2,048,441 also show furrow opener assemblies of interest, and these devices use two separate tubes for depositing material at different levels in the same furrow.

U.S. Pat. No. 3,122,111 shows an implement for sod seeding that has two different types of materials being deposited through a vertical shank, which includes a sealing and covering plate for pulverizing and packing the soil in the furrow and depositing seed on top of this pulverized soil. The particular shoe or blade has an opening at the rear which is shaped to permit a central portion of the pulverized soil to be built up in a type of a mound. The side portions of this shoe extend downwardly to intentionally build up this mound so that the rear slit builds this mound around the path of the seed that is being planted. The device makes grooves on opposite sides of the seed path, but the seed bed is the top or center of the formed mound on which the seed is deposited. The concept is to shave off the hard soil from the sides of the furrow and form a loose soil bed in the center portions of the furrow where the seed is deposited, so that the seed will rest on the center portion of the bed being formed.

SUMMARY OF THE INVENTION

The present invention relates to a furrow opener shank that has means for sealing a deep furrow for placement of liquid fertilizer, or if desired, granular fertilizer, and which includes a pair of diverging tubes primarily for dividing seed being planted into two paths, each path being along side the central line of the shank. A sealer plate is mounted ahead of and below the outlets from the diverging tubes for packing soil over the lowest part of the furrow in which the fertilizer has been deposited, and also forming two distinct grooves or small furrows at the outer sides of the main path for placement of the seeds from each of the diverging tubes so that the tubes deposit seeds into one of these furrows.

The shank assembly has an adapter plate at the top as shown in the aforementioned U.S. application Ser. No. 563,193 to permit applying a wide range of different combinations of seed and fertilizer, but it includes the unique sealer plate that packs material in toward the center and at the same time forms well defined furrows to receive the seeds and place it in the proper location.

BRIEF DESCRIPTION OF THE DRAWINGS

FIG. 1 is a side elevational view of a typical shank assembly having seed depositing means made according to the present invention;

FIG. 2 is a fragmentary enlarged side elevational view of the lower portion of the shank in FIG. 1;

FIG. 3 is a rear view of the device of FIG. 2; and

FIG. 4 is a perspective view of the furrow sealer plate and furrow former of the present invention.

DETAILED DESCRIPTION OF THE PREFERRED EMBODIMENTS

A seeder shank assembly indicated generally at 10 made according to the present invention is mounted onto a suitable support frame or tool bar 11, and has a rearwardly extending beam 12 that is mounted on a pivot pin 13 to clamp on the frame 11 and which has a spring trip control mechanism 14 of suitable and conventional design for maintaining the shank assembly into the ground. The beam 12 has a vertically extending furrow opener shank 15 fixed to the rear of the beam. The furrow opener shank in the form shown in FIGS. 1 through 3 defines a rectangular cross-section tube having an interior dividing wall 16 that extends vertically along its length to divide the shank into two chambers, comprising a first chamber 17 and a second chamber 18.

Reference is made to U.S. patent application Ser. No. 563,198, filed Dec. 19, 1983 for Seeding Apparatus With Fertilizer Spreader, assigned to the same assignee as this application which shows various combinations of seed and or fertilizer attachments that can be used with the present shank.

The vertical shank tube 15 has a furrow opener point of suitable design indicated at 20 fixed to its lower end, which will run below the level of the ground at a desired depth and will open a central furrow. The point 20 has a dividing edge 21 at its leading edge, and can be configured as desired to open an adequate furrow well below the ground. Additionally, spaced apart side plates 22 are provided along the sides of the furrow opening point 20.

In the form shown an adapter plate 25 is removably secured at the upper end of the shank tube 15 and includes an input tubular nipple 26 for receiving liquid or granular fertilizer from a source indicated generally at 27, and a second tubular nipple 28 for receiving seed from a source indicated at 30. The seeds and fertilizer can be metered as desired, and the fertilizer source 27 in the form shown is for liquid fertilizer discharged through a tube 32 down through provided openings to a lower tube end 33 below the surface of the ground and in the furrow that is opened. Granular fertilizer provided through passageway 18 will be discharged from a bottom opening defined at the lower end of the passageway, where tube 33 emerges from the shank.

At the rear of the shank tube 15, and at the lower end there is a tapered guide wall 34 joining the passageway or chamber 17. The guide wall leads to a pair of seed outlet tubes 35 and 36 which diverge in rearward direction, and have a common dividing edge 37 that is used for dividing seed from the passageway 17 into two paths, so that seed will come out through an outlet opening 35A from the tube 35, and from outlet opening 36A from the tube 36 (see FIG. 3). Immediately below these tubes 35 and 36 there is a sealer plate indicated at 39 that is supported on the shank 15, and fixed in position. The sealer plate 39 comprises a unitary cast plate that has a recess indicated at 40 which fits over the side plates 22 just to the rear of the opening point 20. The plate 39 and has a center surface 41 that is a flat surface as shown in FIG. 4, which tapers down slightly when mounted, as shown in FIGS. 1 and 2.

Adjacent to the outer lateral sides of the sealer plate 39, there are furrow opening wedge shaped portions indicated at 42 and 43, respectively, that extend downwardly from the surface 41 and which taper laterally and downwardly in rearward direction from a junction point indicated at 42A and 43A where the wedge portions also start expanding downwardly from surface 41. A narrower space is thus defined at the rear portions of the wedge portions as shown in FIG. 3. These wedge portions thus have outer side surfaces 42B and 43B which are vertically extending, and form planes that lie along the outer sides of the rear ends of the tubes 35 and 36. The inwardly facing surfaces as shown perhaps best in FIG. 4 indicated at 42C and 43C thus not only diverge downwardly but also diverge toward each other to tend to pack material to seal the opening formed by the furrow opener point for the liquid fertilizer at the end 33 of the tube 32 and for the granular fertilizer which is deposited at the lower end of passageway 18. The wedge shaped portions also form generally V-shaped grooves or auxiliary furrows spaced from opposite sides of the center line of the main shank and aligning with the outlet openings 35A and 36A.

Thus when seed comes down through the passageway 17 and is divided into the tubes 35 and 36, it will fall onto a very firm seed bed formed by the sealer plate 39 into the furrows formed by the wedge shaped portions 42 and 43 that taper downwardly in rearward direction, and also have facing surfaces that taper toward each other and toward the center line of the shank in rearward direction to form these furrows. The furrows substantially directly underlie the outlet openings 35A and 36A of the seed tubes 35 and 36.

Thus it can be seen that the sealer plate 39 will pack dirt into the opening left by the point 20, and cover the fertilizer issuing from the discharge end 33 of the liquid fertilizer tube 32, and at the same time, because the surfaces of the wedge shaped members taper not only downwardly along the edges 42D and 43D, but also the surfaces of the wedges taper toward each other in rearward direction and tend to pack material for a firm seed bed and also draw in material from the sides of the furrow formed. The soil is from farther out than the actual shank width, to provide moist soil in the seed bed for good germination. The plate 39 has vertical outer side surfaces 42B and 43B to define the outer sides of the furrows for seed.

Additionally, the sealing action seals in the fertilizer (either granular or liquid) and prevents direct contact of the seed with the fertilizer for rapid growth, good germination, and healthy plants throughout the plant life.

The present device thus provides a rugged shank, with the dual outlets for seed, and a sealer plate that includes furrow forming wedges that provide a seed bed and furrow for each of the outlets on opposite sides of the center line of the shank.

Although the present invention has been described with reference to preferred embodiments, workers skilled in the art will recognize that changes may be made in form and detail without departing from the spirit and scope of the invention.

What is claimed is:

1. A shank for a seeder having furrow opening means at the lower end thereof for penetrating the ground to a desired level to form a main furrow, a sealer plate mounted on said shank above the bottom of the main furrow and trailing the leading portion of the furrow opening means, said sealer plate being below ground level with the shank at working depth and having wedge shaped side portions along opposite sides thereof with each side portion having surfaces that converge downwardly and which define edges that are to the exterior of the furrow opened by the shank, the edges also tapering downwardly in rearward direction, the side portions having facing surfaces on each of the opposite wedge shaped portions that taper toward each other in rearward direction, the side portions forming small auxiliary furrows laterally of the shank below the ground by packing the earth to provide a firm seed bed, said means defining spaced seed outlets on the shank for depositing seed in each of the auxiliary furrows.

2. The apparatus as specified in claim 1 wherein said wedge shaped side portions have substantially vertical outer side surfaces that extend substantially parallel to the direction of movement of the furrow opening shank through the soil, and the facing surfaces having portions adjacent the flat surface portion which taper from a maximum lateral width between the facing surfaces to a minimum lateral width between the facing surfaces in rearward direction.

3. A seeder shank having a furrow opening point at the lower end therof, said furrow opening point having a lower edge which penetrates the ground to a desired working level, a sealer plate mounted on said shank above the lower edge and to the rear of said furrow opening point and being positioned to be below ground level when the furrow opening point is at its desired working level, the sealer plate having a central, downwardly facing substantially flat surface portion and a pair of depending furrow forming portions adjacent the opposite lateral sides thereof and on opposite sides of the flat surface portion, said furrow forming portions each having surfaces that taper toward each other from a maximum spacing between the surfaces adjacent the central surface to edges that are to the exterior of the furrow opened by the shank and which edges taper downwardly in rearward direction, and each of the furrow forming portions having one surface facing the surface of the other furrow forming portion, the facing surfaces having upper edges which taper toward each other in rearward direction, the furrow forming portions packing dirt to form a pair of spaced apart small auxiliary furrows laterally of the shank for preformed seed beds, and such shank further including seed outlet means having outlet openings substantially overlying said small auxiliary furrows.

4. The apparatus as specified in claim 1 wherein said depending furrow forming portions are wedge shaped, and have substantially vertical side surfaces on the outer sides thereof.

5. The apparatus as specified in claim 1 wherein said depending furrow forming portions have substantially vertical outer side surfaces that extend substantially parallel to the direction of movement of the furrow opening shank through the soil, and the facing surfaces having portions adjacent the flat surface portion which taper from a maximum lateral width between the facing surfaces to a minimum lateral width between the facing surfaces in rearward direction.

6. The furrow opening shank of claim 1 wherein the facing surfaces of said furrow forming members also taper laterally outwardly in downward direction from said flat surface portion of said sealer plate.

7. The apparatus as specified in claim 1 and an opening in said shank point adjacent the lower edge thereof, and means to deposit anhydrous ammonia adjacent the lower edge just to the rear of said point, and below said sealer plate.

8. The apparatus as specified in claim 1 wherein said seed outlets comprise a pair of rearwardly extending tubular members having discharge openings substantially vertically overlying the furrow forming portion on the sides of said sealer plate.

9. The apparatus of claim 1 wherein said sealer plate furrow forming portion comprise wedge shaped members on opposite sides of the sealer plate having edges tapering downwardly and toward each other in rearward direction.

* * * * *

UNITED STATES PATENT AND TRADEMARK OFFICE
CERTIFICATE OF CORRECTION

PATENT NO. : 4,607,581
DATED : August 26, 1986
INVENTOR(S) : Ivyl D. Kopecky

It is certified that error appears in the above-identified patent and that said Letters Patent is hereby corrected as shown below:

Column 4, line 63, after "claim" delete "1", insert --3--;

Column 4, line 67, after "claim" delete "1", insert --3--;

Column 5, line 8, after "claim" delete "1", insert --3--;

Column 5, line 12, after "claim" delete "1", insert --3--;

Column 6, line 3, after "claim" delete 1, insert --3--;

Column 6, line 8, after "claim" delete 1, insert --3--.

Signed and Sealed this

Second Day of August, 1988

Attest:

DONALD J. QUIGG

*Attesting Officer*  *Commissioner of Patents and Trademarks*